United States Patent [19]

Sage

[11] 4,394,393
[45] Jul. 19, 1983

[54] METHOD FOR PEELING CITRUS FRUIT

[76] Inventor: Paul F. Sage, Box 191-F, Babson Park, Fla. 33827

[21] Appl. No.: 324,380

[22] Filed: Nov. 23, 1981

Related U.S. Application Data

[62] Division of Ser. No. 141,376, Apr. 18, 1980, Pat. No. 4,318,339.

[51] Int. Cl.³ .................... G01N 33/02; A23N 7/00
[52] U.S. Cl. .................................... 426/231; 426/482
[58] Field of Search ............... 426/231, 481, 482, 518, 426/616; 99/589, 545; 198/597

[56] References Cited

U.S. PATENT DOCUMENTS

| | | | |
|---|---|---|---|
| 1,350,096 | 8/1920 | Fisher | 99/589 |
| 1,615,304 | 1/1927 | Korner et al. | 99/589 |
| 3,128,810 | 4/1964 | Whipp | 99/545 |
| 4,039,070 | 8/1977 | Harrison | 198/597 |

Primary Examiner—Raymond N. Jones
Assistant Examiner—George C. Yeung
Attorney, Agent, or Firm—Duckworth, Allen, Dyer & Pettis

[57] ABSTRACT

A method for cold peeling citrus fruit is disclosed wherein the fruit is first cored and sliced into a plurality of segments and the pulp is thereafter severed from the peel by forcing the segment through a knife. An apparatus is disclosed where the fruit segment is secured and compressed on a concave rotary carrier which is then rotated through a concave severing knife which severs the peel and albedo from the pulp.

1 Claim, 5 Drawing Figures

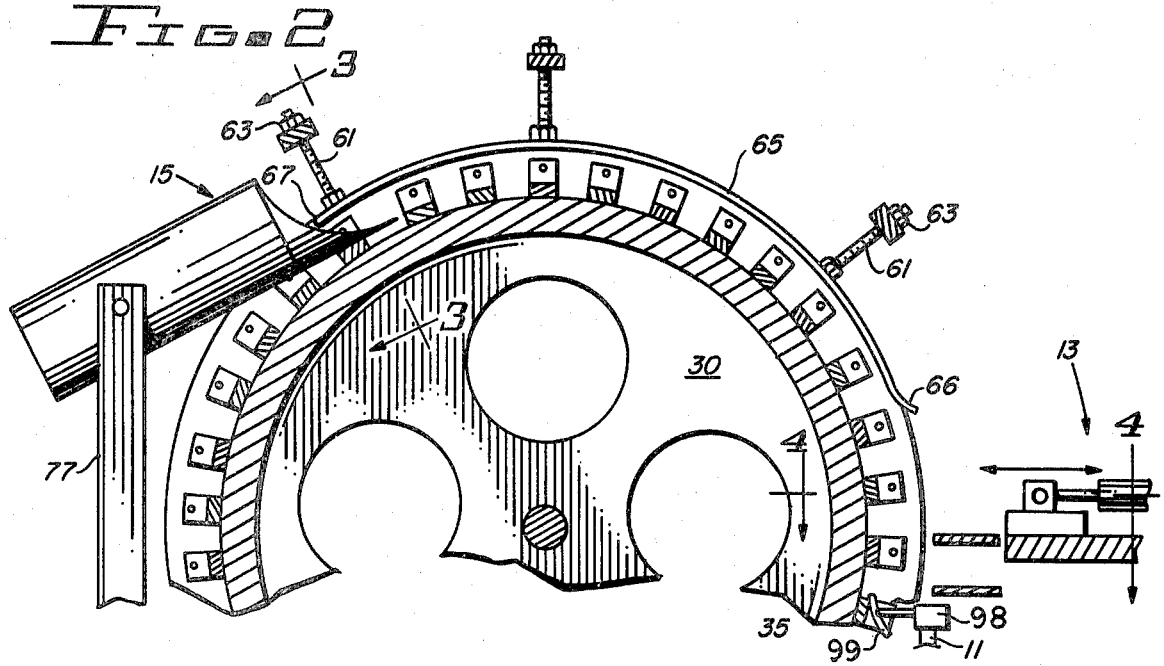
FIG. 2
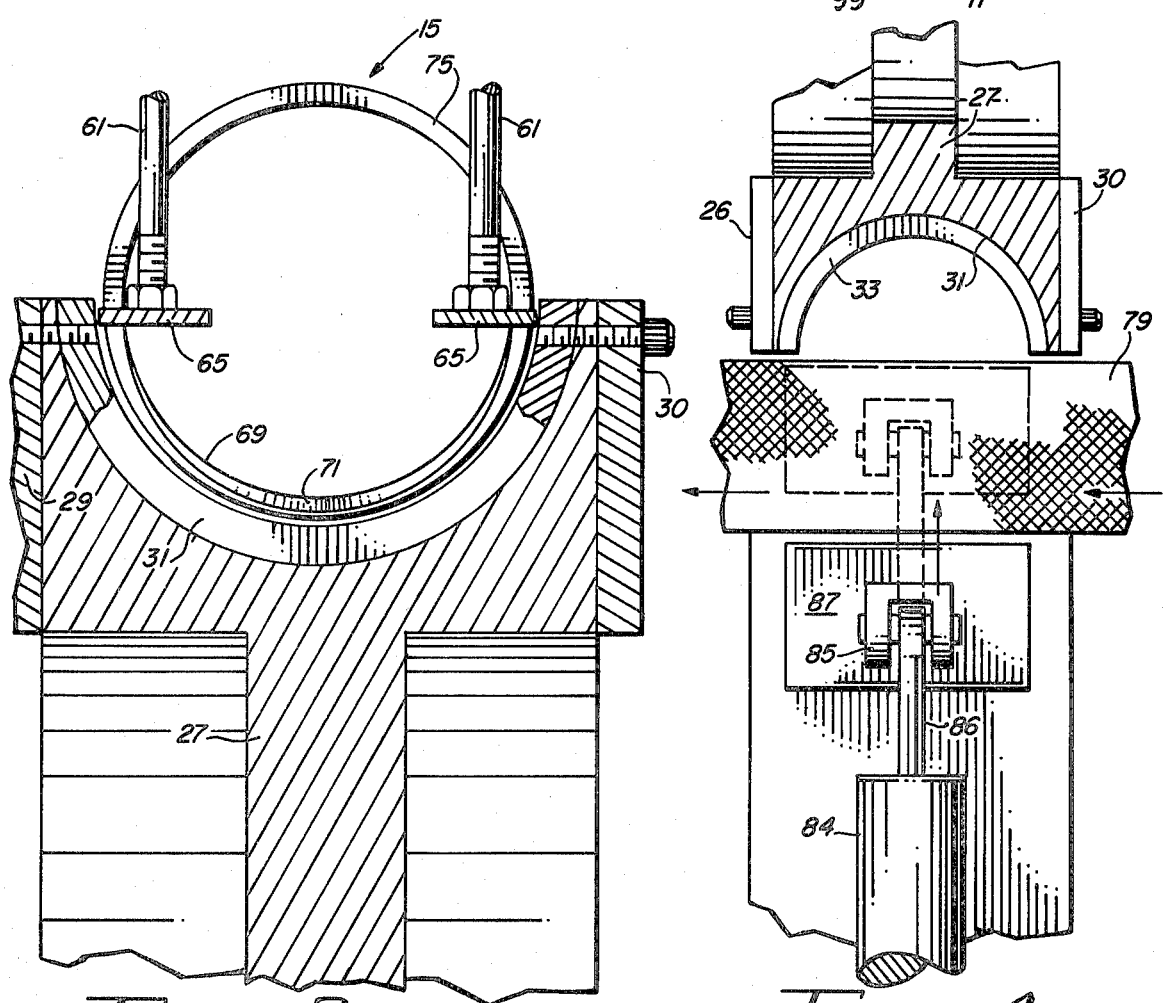
FIG. 3
FIG. 4

METHOD FOR PEELING CITRUS FRUIT

This is a division, of application Ser. No. 141,376 filed Apr. 18, 1980, U.S. Pat. No. 4,318,339.

BACKGROUND OF THE INVENTION

The present invention relates to a method of removing the pulp from the peel and albedo of a citrus type fruit, and more specifically to a method where the separation is achieved without heating the fruit.

The conventional method for peeling oranges includes the steps of aging the fruit for about three or four days, cleaning and sizing the fruit, coring, peeling by a process which includes heating the fruit, then immersing the peeled orange in a lye bath to remove the albedo and finally sectioning the pulp by sensing the membranes of the fruit and cutting around the membrane. One of these types of machines is described in U.S. Pat. No. 3,117,604 (Polk, Jan. 14, 1974).

Other methods of peeling and processing citrus fruit are found in the following representative patents: U.S. Pat. Nos. 4,139,651 (Sekiguchi); 2,930,706 (Moulton); 3,396,040 (Cohen); 3,592,664 (Verlin); and U.S. Pat. No. Re. 27,646 (Cohen).

The disadvantage with all the methods decribed in those patents is that they use a hot peeling technique, which results in undesirable taste characteristics.

BRIEF SUMMARY OF THE INVENTION

The method of the invention includes the steps of coring the fruit; cutting the fruit into twelve uniform segments; firmly securing the segment by forcing it down on a concave surface to mold the peel to the concave surface; and then bringing the segment in contact with a knife edge so that the pulp is cleanly cut from the peel and albedo. The method is carried out by an apparatus which includes conventional means for cutting the fruit into twelve uniform segments a conveyor to move each segment into a position whereby the segments can be pushed onto a rotary carrier by a leading air cylinder which is engaged by a cylinder actuation switch coupled to the rotary carrier. The segment is held in place in the concave rotary carrier by hold down guides. The rotary carrier is rotated and the segment is brought into contact with a severing knife having a concave blade with a pointed end portion. The severing knife is attached to a delivery tube through which the pulp of the fruit is guided.

BRIEF DESCRIPTION OF THE DRAWINGS

Further details are explained below with the help of examples illustrated in the attached drawings, in which:

FIG. 2 is a side view of the rotary carrier and the cutting system of the citrus peeling apparatus;

FIG. 3 is a front view of the cutting system and a cross section of the rotary carrier of the citrus peeling apparatus;

FIG. 4 is a top view of the loading system of the citrus peeling apparatus; and

DETAILED DESCRIPTION OF THE INVENTION

Figure 1:
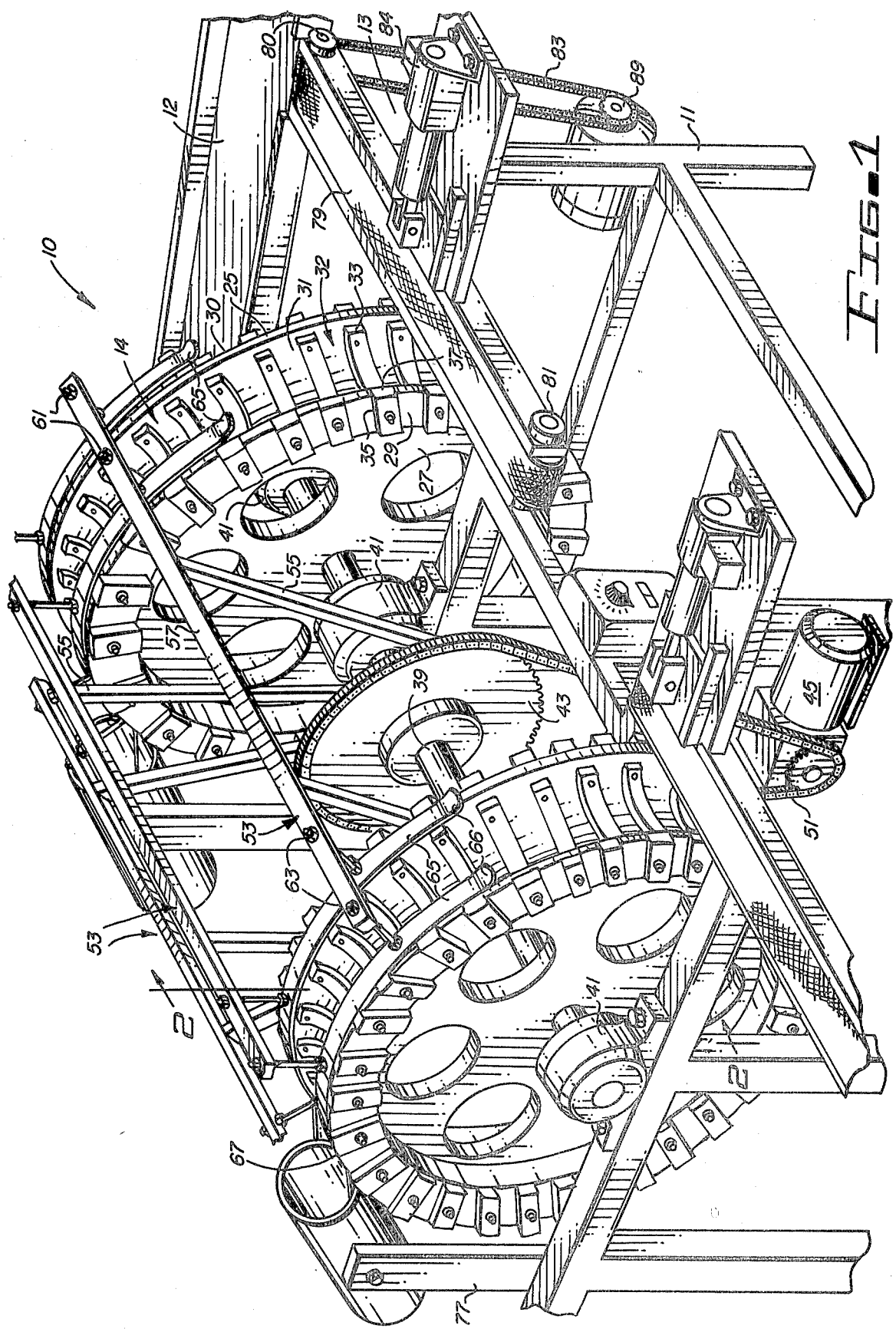
FIG. 1 is a perspective drawing of the citrus peeling apparatus.

In the drawings a citrus peeling apparatus 10 (FIG. 1) is shown having a frame 11 supporting an accumulation table 12, a loading system 13, a carrier system 14, and a severing system 15. The peeling apparatus 10 is used in conjunction with conventional means for washing, coring and slicing the citrus fruit (not shown). The cored fruit is sliced into twelve substantially uniform wedge shaped fruit segments which are then dumped on the accumulation table 12.

The carrier system 14 had a rotary carrier 25, with a circular member 27 and a first circular side plate 29 and a second circular side plate 30 disposed at the sides of the periphery of the circular member 27. The longitudinal periphery of the rotary carrier is an annular concave member 31, defining a concave surface 32, and having a plurality of concave separating strips 33 attached thereto at uniform intervals. The separating strips 33 serve as stops to prevent the fruit segments from slipping on the concave surface of the annular concave member 31. Also attached to the circular side plates 29 and 30 are a plurality of cam members 35 each having a cam surface 37 which is substantially parallel to the surface of the circular side plates 29 and 30.

The rotary carrier 25 is disposed on a central shaft 39 which is supported by bearings 41 and is coupled to a rotary carrier drive gear 43. An electric drive motor 45 is disposed on a motor platform 47 which is attached to the frame 11. The electric drive motor 45 is mechanically coupled to the rotary carrier drive gear 43 by means of carrier drive chain 51.

Also attached to the frame 11 are a plurality of hold down frames 53 having substantially vertical members 55 and transverse members 57. Two holes are provided at each end of the transverse members and bolts 61 are inserted thereto and secured to the transverse members by means of nuts 63. As shown in FIG. 2, the head of each bolt 61 abut on one or a pair of curved hold down guides 65 each with a first end 66 adjacent the loading system 13, and a second end 67 adjacent to the severing system 15. The hold down guides 65 are shaped so as to have the first end 66 disposed outside the outer circumference of the rotary carrier 25 and the second end 67 disposed inside the outer circumference of the rotary carrier, as shown in FIG. 3. Because of the difference in the relative position of the ends 66 and 67, the hold down guides 65 will push against the fruit segments as the rotary carrier 25 rotates, thereby pushing the peel of the fruit segment flush with the concave surface 32 of the annular concave member 31.

Figure 5:
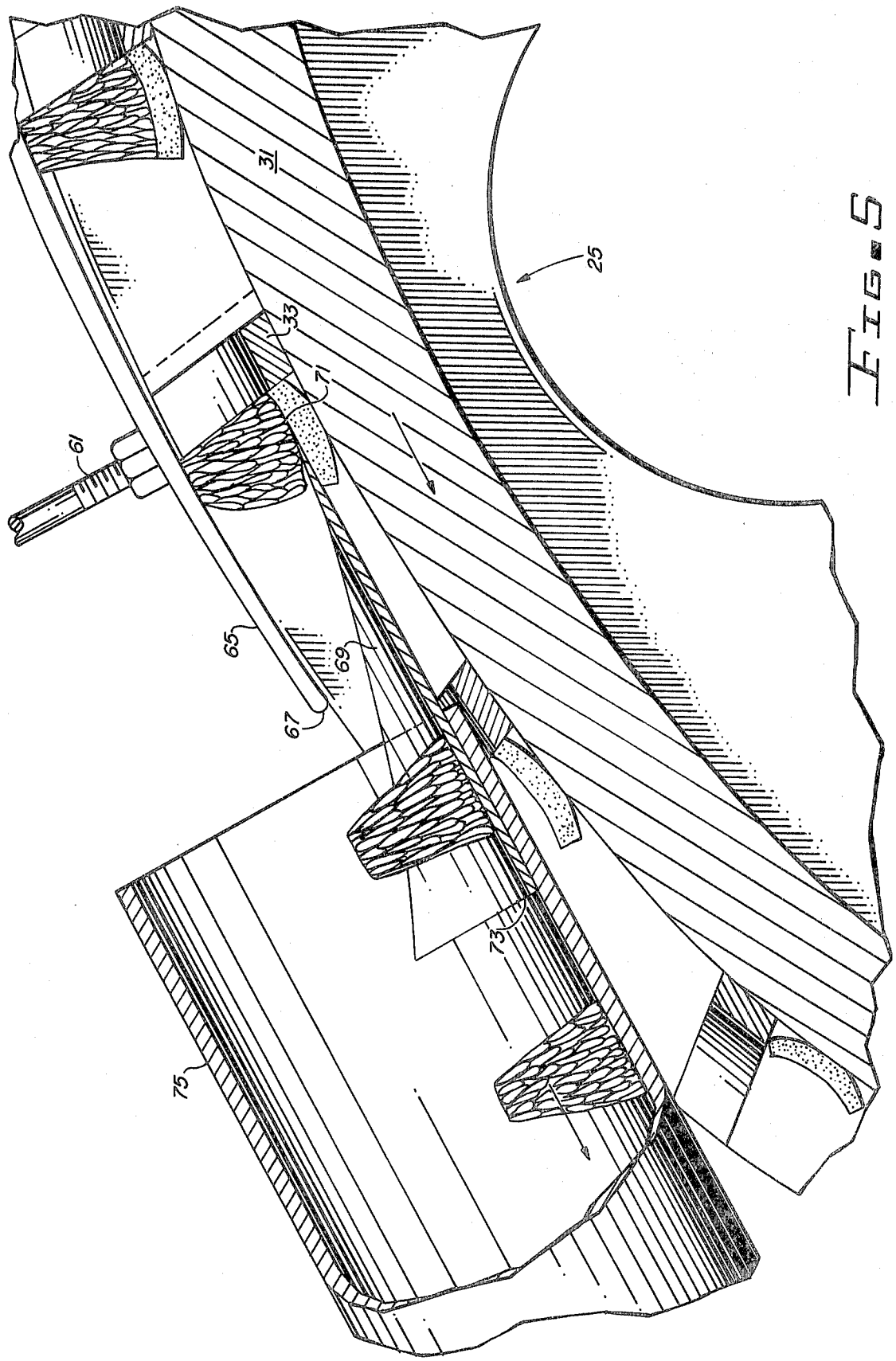
FIG. 5 is a cross section through the severing blade of the cutting system of the citrus peeling apparatus.

The severing system 15 shown in FIGS. 3 and 5 contains a concave blade 69 with a substantially pointed end 71 and a curved end 73. The curved end is attached to a delivery tube 75 which is connected to the frame 11 by cutting system support member 77 (shown in FIG. 1). The concave blade 69 is shaped so as to substantially conform with the concave surface 32 of the annular concave member 31. The concave blade 69 is disposed a predetermined distance away from the concave member 31, the predetermined distance being at least equal to the combined thickness of the peel and albedo of the fruit segment. The concave bladed 69 and delivery tube 75 are oriented so as to have a substantial vertical component so that as the pulp is severed from the peel and albedo, the pulp falls through the delivery tube 75 by the action of gravity.

The loading system 13 shown in FIGS. 1 and 4 comprises a conveyor belt 79 having a first end which is disposed adjacent to the accumulation table 12 and a second end disposed past the carrier system 14. The first end of the conveyor belt 79 is engaged to a belt drive gear 80, and the second end is supported by belt end bearings 81. The conveyor belt 79 is disposed so as to have a side portion adjacent to and substantially perpendicular to the rotary carrier 25. The conveyor is driven by electric stepping motor 89 and drive chain 83 which are mechanically coupled to belt drive gear 80.

Also forming part of the loading system 13 is an air cylinder 84 which is disposed adjacent to the side of the conveyor belt 79 opposite to the rotary carrier 25. The air cylinder 79 is provided with a piston 85 activated by a rod 86, which together move loading plate 87 over the conveyor belt 79. As shown in FIG. 2 the air cylinder is controlled by a cylinder actuation switch 98. The switch 88 is supported by the frame 11 and has a curved member 99 which intermittently comes in contact with cam members 35 disposed on the rotary carrier 25. The same switch can be used to control the operation of the conveyor.

The operation of the system can best be described by Separating into two operations, the loading and severing operations. During the loading operation, segments of cored and cut citrus fruit are dumped on the accumulation table 12 and are drawn, in single file, by the conveyor belt 79 to a position adjacent the loading plate 87. As the rotary carrier 25 rotates the curved member 99 of the cylinder actuation switch 98 comes in contact with the cam member 35 of the rotary carrier 25 thereby engaging the actuation switch 98 which controls the air cylinder 84 and the conveyor belt 79. The air cylinder 84 would then be actuated and cause the loading plate 87 to push a fruit section to the circular carrier 25. There the fruit would be retrained by one of the plurality of concave separating strips 33. As the rotary carrier 25 continues its rotating motion the fruit is carried away and comes in contact with the hold down guides 65 which force the fruit wedge tightly downwards against the concave separating strip 33 and the concave surface 32. The fruit continues to rotate and will come in contact with the severing system 15 for the severing operation.

The severing operation is best shown in FIG. 5 which shows a section of citrus fruit wedged against the concave surface 32 of the annular concave member 31, a separating strip 33 and the hold down guide 65. As the rotary carrier 25 rotates the fruit comes in contact with the pointed end 71 of the blade 69 which begins the severing process, separating the pulp from the peel and albedo. The continued rotation of the rotary carrier will result in the complete severance of the pulp from the peel and the pulp will then enter into the delivery tube 75 and fall down through the delivery tube due to the action of gravity. The peel would be carried downwards and would eventually fall off, again due to the action of gravity.

As shown in FIG. 1, two rotary carriers 25 may be driven by a single electric drive motor 45. In that embodiment, two accumulation tables 12, two loading systems 13, two carrier systems 14, and two severing systems 15 are disposed symmetrically about the single motor 45, thereby doubling the output of the overall system.

I claim:
1. A method for removing the peel and albedo from the pulp of citrus fruit comprising the steps of:
coring the fruit;
slicing the fruit into twelve uniform segments;
placing the fruit segments in a conveyor to laterally transport individual fruit segments;
sensing the position of a concave rotary carrier;
pushing the fruit segment into the concave rotary carrier when the rotary carrier is at a predetermined loading position;
confining the fruit segment to a radial position on the concave rotary carrier;
forcing the fruit segment substantially towards the center of the concave rotary carrier so that the peel of the fruit is molded against the concave surface of the concave rotary carrier;
rotating the rotary carrier;
forcing the fruit segment through a pointed concave severing knife having a concave surface substantially the same as the concave surface in the rotary carrier and disposed an incremental distance away from the rotary carrier at least equal to the thickness of the peel and albedo layer of the fruit segment, the severing knife being oriented so as to have a substantial vertical component whereby the pulp will fall from the severing knife by the action of gravity.

* * * * *